United States Patent
Wang et al.

(10) Patent No.: US 9,091,874 B2
(45) Date of Patent: Jul. 28, 2015

(54) TOUCH CONTROL LIQUID CRYSTAL DISPLAY DEVICE

(71) Applicant: Shanghai Tianma Micro-Electronics Co., Ltd., Shanghai (CN)

(72) Inventors: Lihua Wang, Shanghai (CN); Conghua Ma, Shanghai (CN); Qijun Yao, Shanghai (CN); Jun Ma, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 29 days.

(21) Appl. No.: 14/101,941

(22) Filed: Dec. 10, 2013

(65) Prior Publication Data

US 2014/0168540 A1   Jun. 19, 2014

(30) Foreign Application Priority Data

Dec. 14, 2012   (CN) .......................... 2012 1 0545803

(51) Int. Cl.
| | |
|---|---|
| *G02F 1/1335* | (2006.01) |
| *G02F 1/1333* | (2006.01) |
| *G06F 3/041* | (2006.01) |
| *G06F 3/044* | (2006.01) |

(52) U.S. Cl.
CPC ............ *G02F 1/13338* (2013.01); *G06F 3/044* (2013.01); *G06F 3/0412* (2013.01)

(58) Field of Classification Search
USPC .................................. 349/1, 21; 345/175–178
See application file for complete search history.

(56) References Cited

U.S. PATENT DOCUMENTS

| | | | | |
|---|---|---|---|---|
| 2006/0256093 | A1* | 11/2006 | Furukawa et al. | ............ 345/173 |
| 2011/0057905 | A1* | 3/2011 | Yu et al. | ........................ 345/174 |
| 2012/0268396 | A1* | 10/2012 | Kim et al. | ..................... 345/173 |

FOREIGN PATENT DOCUMENTS

CN  202735635  2/2013

OTHER PUBLICATIONS

Office Action for Chinese Patent Application No. 201210545803.6, mailed on Apr. 3, 2015, 5 pages total (English translation not available).

\* cited by examiner

*Primary Examiner* — Paul Lee
(74) *Attorney, Agent, or Firm* — Kilpatrick Townsend & Stockton LLP (57) ABSTRACT

One inventive aspect is a touch control liquid crystal display device. The device includes a color film substrate, a thin film transistor array substrate, and a liquid crystal layer between the color film substrate and the thin film transistor array substrate. The color film substrate includes a grid-shaped black matrix layer, a touch control layer, and a color film layer. The touch control layer includes metal grid electrodes in a rectangle, where the metal grid electrodes include metal lines intersecting transversely and vertically. In addition, the metal grid electrodes include drive electrodes and sense electrodes. The drive electrodes are connected together through first metal connection lines in a first direction, and the sense electrodes are connected together through second metal connection lines in a second direction. In addition, the projection of the metal grid electrodes falls into the projection of the black matrix layer in the light transmission direction.

15 Claims, 12 Drawing Sheets

TOUCH CONTROL LIQUID CRYSTAL DISPLAY DEVICE

CROSS-REFERENCES TO RELATED APPLICATIONS

This application claims the benefit of priority to Chinese Patent Application No. 201210545803.6, filed with the Chinese Patent Office on Dec. 14, 2012, entitled "Touch Control Liquid Crystal Display Device", the contents of which is incorporated herein by reference in its entirety.

TECHNICAL FIELD

The present invention relates to the field of touch display technologies and particularly to a touch control liquid crystal display device.

BACKGROUND OF THE INVENTION

A touch screen which is an input medium is the most simple, convenient and natural human-machine interaction means at present. Thus touch screens have been increasingly applied to various electronic products, e.g., a mobile phone, a notebook computer, an MP3/MP4, etc.

Figure 1:
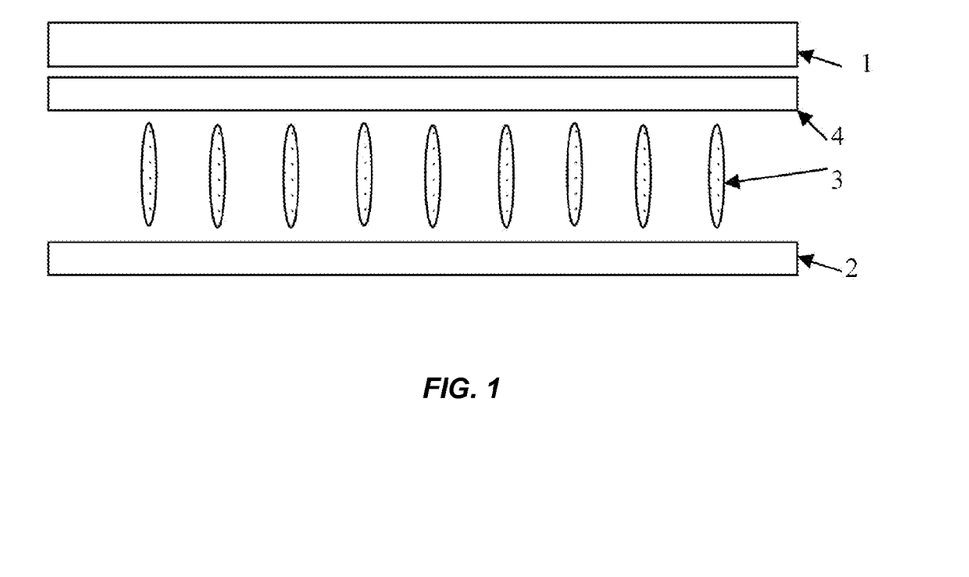
FIG. 1 is a touch control liquid crystal display device in the prior art.

FIG. 1 is a touch control liquid crystal display device in the prior art, and as illustrated, the touch control liquid crystal display device includes a substrate 2, a color film substrate 1, and a liquid crystal layer 3 arranged between the array substrate 2 and the color film substrate 1, and further includes a touch control layer 4 arranged between the liquid crystal layer 3 and the color film substrate 1. The touch control liquid crystal display device includes a plurality of pixel elements, all of which can control liquid crystals in their regions separately to be deflexed and further control a transmittivity of rays to thereby form a brightness-and-darkness variable display.

Figure 2:
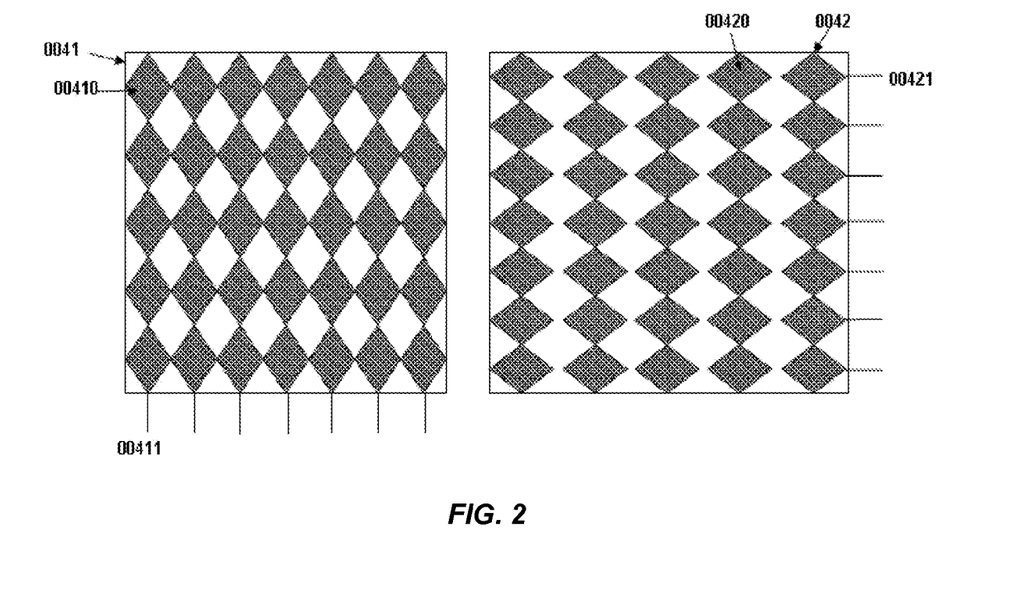
FIG. 2 is a schematic structural diagram of a drive electrode layer and a sense electrode layer of the touch control liquid crystal display device illustrated in FIG. 1.

The touch control layer 4 is a multi-layer structure including a drive electrode layer 0041, a sense electrode layer 0042, and an insulation layer arranged between the drive electrode layer 0041 and the sense electrode layer 0042. FIG. 2 illustrates a structure of the drive electrode layer and the sense electrode layer, where the drive electrode layer 0041 includes a plurality of diamond-shaped drive electrodes 00410 extending in the Y direction and connected with each other to form drive lines, each of which is connected respectively to an external signal 00411; and the sense electrode layer 0042 includes a plurality of diamond-shaped sense electrodes 00420 extending in the X direction and connected with each other through metal bridges to form sense lines, each of is connected respectively to an external signal 00422. Gaps are arranged between the respective drive electrodes 00410 and sense electrodes 00420 insulated from each other.

In the existing touch control liquid display device, the size and the shape of the drive electrodes 00410 and the sense electrodes 00420 do not agree with those of the pixel elements, so some pixel elements correspond to the drive electrodes 00410 or the sense electrodes 00402, and some pixel elements correspond to the gaps between the drive electrodes 00410 and the sense electrodes 00420. Typically the drive electrodes 00410 and the sense electrodes 00420 are electrodes formed of a transparent electrically-conductive material, e.g., a film thin of indium tin oxide (ITO), thus influencing the transmittivity of rays to some extent, so that the transmittivity of the pixel elements corresponding to the drive electrodes 00410 or the sense electrodes 00420 may not agree with the transmittivity of the pixel elements corresponding to the gaps, thus resulting in uniformity of a display.

Figure 3:
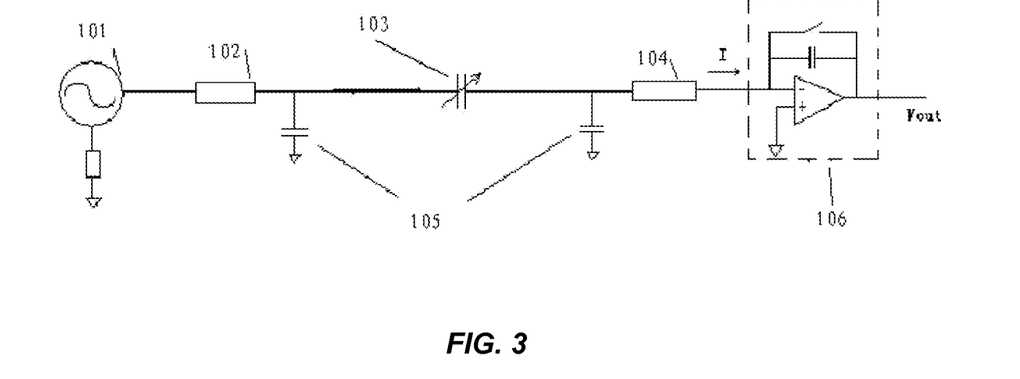
FIG. 3 is an equivalent circuit of the touch control liquid crystal display device illustrated in FIG. 1.

In the meantime, in the touch control liquid crystal display device in the prior art, all the drive electrodes or the sense electrodes will overlap with pixel electrodes, data lines and scan lines on the array substrate 2, and capacitances will be formed in their overlapping sections. FIG. 3 is an equivalent circuit of the traditional touch control liquid crystal display device, and as illustrated in FIG. 3, the alternating current drive power supply 101 is connected to the drive line 102, the drive line 102 with a specific length is equivalent to a resistance, and the drive electrode and the sense electrode form a mutual capacitance 103 at their intersection, and when there is a touch, the value of the mutual capacitance 103 will vary. Moreover the drive electrode and the sense electrode will also form a parasitic capacitance 105 respectively with another electrically conductive layer.

In a detection scheme of the traditional mutual capacitive touch screen, each drive line 102 is scanned sequentially, that is, a drive voltage 101 is applied sequentially to each drive line 102 while the remaining drive lines are grounded, and each sense line 104 is connected at a detection terminal to a detection unit 106, thereby detecting a signal on each sense line 104. Since a finger is a conductor, the mutual capacitance 103 at the location of a touch will vary due to a capacitive inductive effect of the finger when the finger touches the surface of the touch screen. This variation can be detected by the detection unit 106 to thereby judge whether and where there is a touch by the finger.

A drive signal may be seriously distorted when the parasitic capacitance 105 is very large. Distortion of the drive pulse will have an adverse influence upon a detection signal in the following two aspects that firstly the detection signal will be seriously attenuated and secondly if a touch signal is detected by acquiring charges, then distortion of the drive pulse will have the acquired charges varied all the time, thus making it difficult to detect; and this distortion will have a more serious influence upon a Fringe Field Switching (FFS) or In Plane Switching (IPS)-type liquid crystal screen. Since FFS and IPS is very sensitive to a variation or non-uniformity of an electric field, in the touch control liquid crystal display device in the prior art, drive electrodes or sense electrodes are arranged in correspondence to an area of some pixel elements while gaps between the drive electrodes or the sense electrodes correspond to an area of some pixel elements, and there are different strengths of the electric field at the locations of the electrodes and the gaps, thus influencing rotation of liquid crystal molecules and further having them deviate from a predetermined deflection angle to result in distortion which can be referred to noise of the touch control layer.

In the touch control liquid crystal display device, the pixel electrodes, the data lines, the scan lines and other electrically conductive layers on the touch control layer and the array substrate are at a short distance, so there is a large parasitic capacitance which hinders the touch signal from being detected. Moreover the touch control liquid crystal display device has to let light transmitted, so the touch control layer has to be of a light-transmitting material, e.g., a film thin of indium tin oxide (ITO), as described above, but the resistivity of the film thin of ITO is far larger than general metal so that there is a very large resistance of the touch control layer, thus lowering the sensitivity of detection by the touch control layer and increasing a load of the touch control layer. Consequently it is desired to address the problems of lowering the resistance and the parasitic capacitance, increasing the transmittivity and improving a display effect in the touch control liquid crystal display device.

BRIEF SUMMARY OF THE INVENTION

One inventive aspect is a touch control liquid crystal display device. The liquid crystal display device includes a color film substrate, a thin film transistor array substrate, and a liquid crystal layer arranged between the color film substrate and the thin film transistor array substrate. The color film substrate includes a grid-shaped black matrix layer, a touch control layer, and a color film layer. The touch control layer includes a plurality of metal grid electrodes arranged in a rectangle, where the metal grid electrodes include a plurality of metal lines intersecting transversely and vertically. In addition, the metal grid electrodes include a plurality of drive electrodes and a plurality of sense electrodes. The plurality of drive electrodes are connected together through a plurality of first metal connection lines in a first direction, and the plurality of sense electrodes are connected together through a plurality of second metal connection lines in a second direction. In addition, the projection of the metal grid electrodes falls into the projection of the black matrix layer in the light transmission direction.

DETAILED DESCRIPTION OF THE PREFERRED EMBODIMENTS

Embodiments of the invention provide a touch control liquid crystal display device using a metal grid as a touch control layer so as to address the problem of a large parasitic capacitance, low sensitivity of detection and non-uniform transmittivity in an existing touch control liquid crystal display device.

Figure 4:
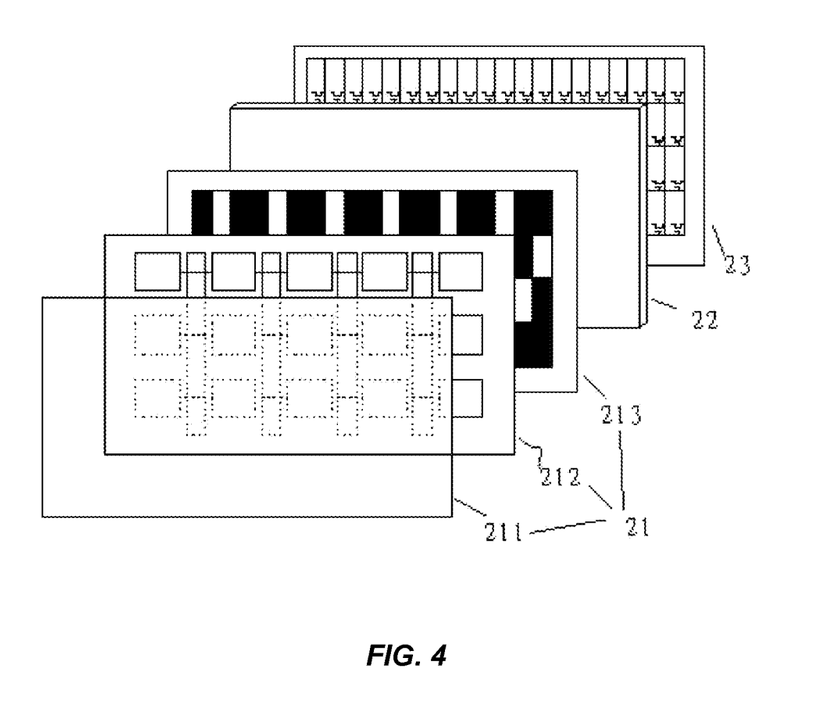
FIG. 4 is a schematic diagram of a touch control liquid crystal display device according to an embodiment of the invention.

Referring to FIG. 4, a touch control liquid crystal display device according to an embodiment of the invention includes a color film substrate 21, a thin film transistor array substrate 23, and a liquid crystal layer 22 arranged between the color film substrate 21 and the thin film transistor array substrate 23, and the color film substrate 21 includes a glass substrate (not illustrated), a grid-shaped black matrix layer 211, a touch control layer 212 and a color film layer 213 in that order.

Where the touch control layer 212 includes a plurality of metal grid electrodes arranged in a rectangle, where the metal grid electrodes are consisted of a plurality of metal lines intersecting transversely and vertically, and the metal grid electrodes include a plurality of drive electrodes and a plurality of sense electrodes, and the plurality of drive electrodes are connected together through a plurality of first metal connection lines in a first direction, and the plurality of sense electrodes are connected together through a plurality of second metal connection lines in a second direction; and The projection of the metal grid electrodes falls into the projection of the black matrix layer in the light transmission direction.

Preferably the touch control layer is a multi-layer structure including a first metal layer, a second metal layer, and an insulation layer arranged between the first metal layer and the second metal layer.

Figure 5:
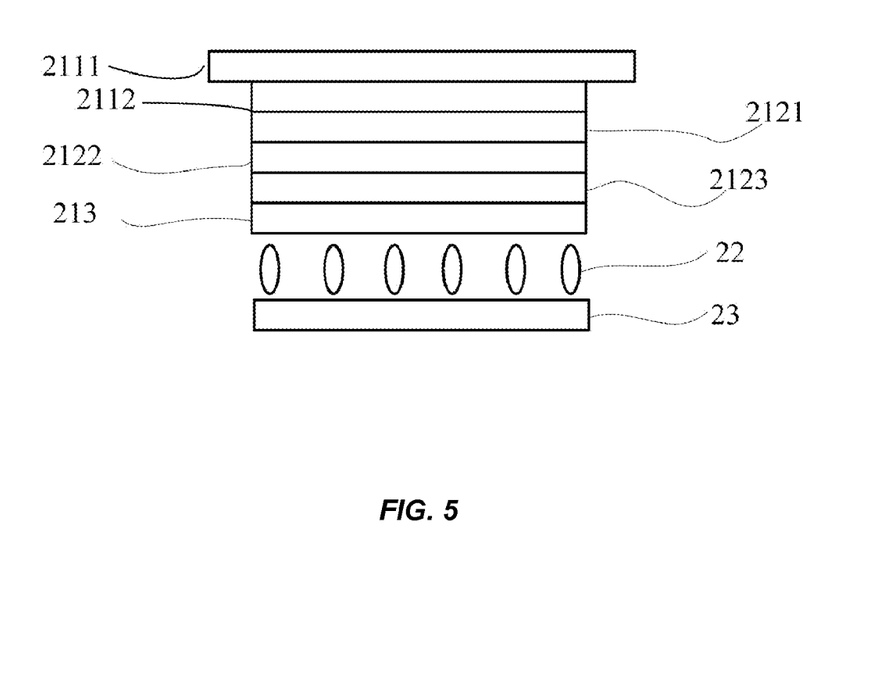
FIG. 5 is a schematic structural sectional view of the touch control liquid crystal display device illustrated in FIG. 4.

Specifically, in a sectional structure as illustrated in FIG. 5, the touch control liquid crystal display device structurally includes the following components from the top to the bottom:

A glass substrate 2111, a grid-shaped black matrix layer 2112, and a touch control layer below the black matrix layer 2112, the touch control layer from the top to the bottom including a first metal layer 2121, an insulation layer 2122 and a second metal layer 2123 below which there are a color film layer 213, a liquid crystal layer 22 and a thin film transistor array substrate 23.

Preferably the plurality of drive electrodes, the plurality of sense electrodes and the plurality of first metal connection lines are formed in the first metal layer 2121; and the plurality of second metal connection lines are formed in the second metal layer 2123; and specifically, for example, the plurality of drive electrodes are connected together through the plurality of first metal connection lines in the X direction, and a plurality of resulting rows of drive electrodes and the plurality of sense electrodes serve as the first metal layer; and the plurality of sense electrodes are connected together through the plurality of second metal connection lines in the Y direction, that is, the insulation layer across the first metal layer and the second metal layer forms a bridge structure in the Y direction.

Preferably the plurality of drive electrodes, the plurality of sense electrodes and the plurality of second metal connection lines are formed in the first metal layer; and the plurality of first metal connection lines are formed in the second metal layer; and specifically, for example, the plurality of drive electrodes are connected together through the plurality of first metal connection lines in the Y direction, and a plurality of resulting columns of drive electrodes and the plurality of sense electrodes serve as the first metal layer; and the plurality of sense electrodes are connected together through the plurality of second metal connection lines in the X direction, that is, the insulation layer across the first metal layer and the second metal layer forms a bridge structure in the X direction.

Preferably the plurality of drive electrodes and the plurality of first metal connection lines are formed in the first metal layer; and the plurality of sense electrodes and the plurality of second metal connection lines are formed in the second metal layer; and specifically, for example, the plurality of drive electrodes are connected together through the plurality of first metal connection lines in the X direction, and a plurality of resulting rows of drive electrodes serve as the first metal layer; and the plurality of sense electrodes are connected together through the plurality of second metal connection lines in the Y direction, and a plurality of resulting columns of sense electrodes serve as the second metal layer.

Preferably the plurality of sense electrodes and the plurality of second metal connection lines are formed in the first metal layer; and the plurality of drive electrodes and the plurality of first metal connection lines are formed in the second metal layer; and specifically, for example, the plurality of drive electrodes are connected together through the plurality of first metal connection lines in the Y direction, and a plurality of resulting columns of drive electrodes serve as the first metal layer; and the plurality of sense electrodes are connected together through the plurality of second metal connection lines in the X direction, and a plurality of resulting rows of sense electrodes serve as the second metal layer.

Preferably the shape of the outline of the metal grid electrodes is a square, a triangle, a diamond or another regular shape.

Preferably the side length of the metal grid electrodes ranges from 50 to 150 μm.

Preferably the line width of the metal grid electrodes is smaller than the line width of a grid of the black matrix layer.

Preferably the line width of the metal lines in the metal grid electrodes ranges from 2 to 7 μm.

Preferably the material of the black matrix layer is a resin material with a resistance above 107Ω.

Preferably the touch control liquid crystal display device further includes a planar layer below the color film layer.

Preferably the thickness of the planar layer ranges from 1 to 5 μm.

Preferably the protection of the first metal connection lines or the second metal connection lines falls into the protection of the black matrix layer in the light transmission direction.

Preferably the first metal connection lines or the second metal connection lines are consisted of a plurality of metal lines intersecting transversely and vertically.

Preferably the first metal connection lines or the second metal connection lines are consisted of a plurality of transverse metal lines.

Preferably the first metal connection lines or the second metal connection lines are consisted of a plurality of vertical metal lines.

Preferably the liquid crystal screen is a TN-type liquid crystal screen, a common electrode is arranged below the color film layer, i.e., on a side facing the liquid crystal layer, and a plurality of pixel electrodes are arranged on the array substrate.

Preferably the liquid crystal screen is an FFS or IPS-type liquid crystal screen, and a plurality of pixel electrodes and a common electrode are arranged on the array substrate. In the invention, metal grids are used as TP patterns to thereby lower a coupling capacitance between the TP and TFT sides and consequently an influence of a TP signal upon a display on a panel.

Hereinafter the technical solution of the invention will be described with reference to the drawings and particular embodiments thereof, and it shall be noted that the following embodiments are intended to facilitate understanding of the invention but not to limit the invention.

First Embodiment

Figure 6:
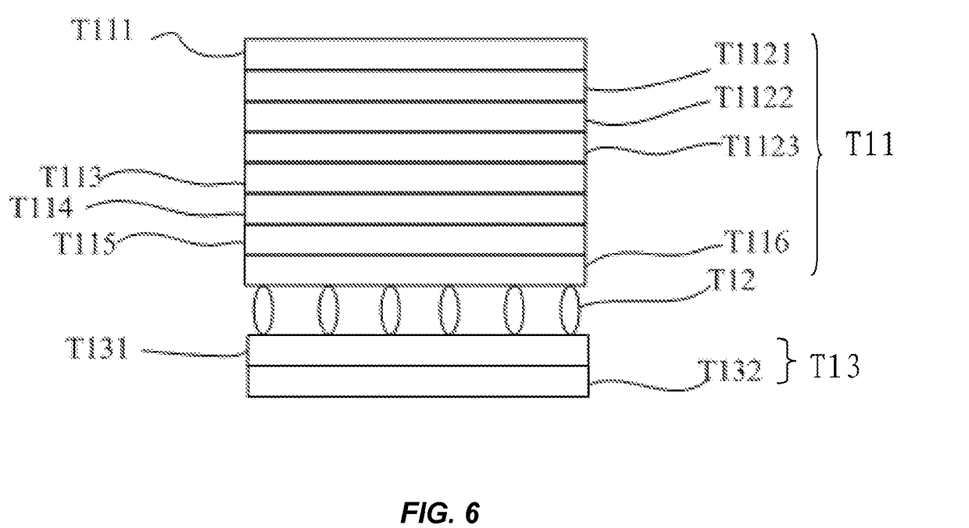
FIG. 6 is a schematic diagram of a TN-type touch control liquid crystal display device according to a first embodiment of the invention.
Figure 7A:
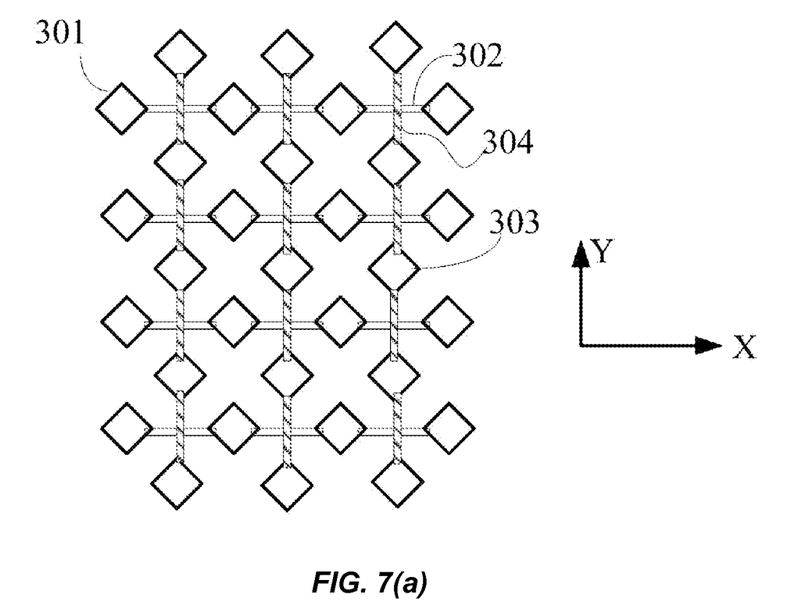
FIG. 7(a) is structural top view of a touch control layer according to the first embodiment.
Figure 7B:
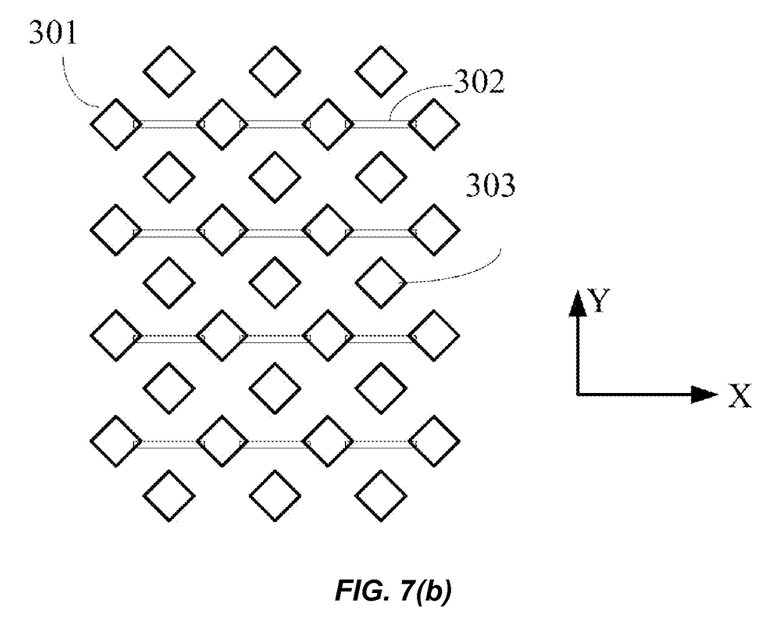
FIG. 7(b) is a structure of a first metal layer of the touch control layer according to the first embodiment.
Figure 7C:
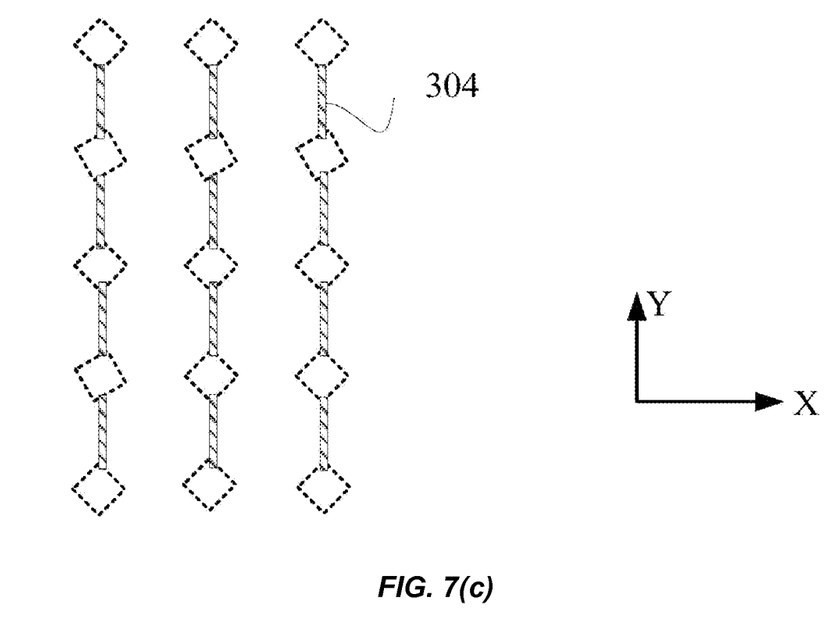
FIG. 7(c) is a structure of a second metal layer of the touch control layer according to the first embodiment.

Referring to FIG. 6, a TN-type touch control liquid crystal display device according to the embodiment of the invention includes a color film substrate T11, a thin film transistor array substrate T13, and a liquid crystal layer T12 arranged between the color film substrate T11 and the thin film transistor array substrate T13.

Where the color film substrate T11 includes a glass substrate T111, a grid-shaped black matrix layer T1121, a touch control layer and a color film layer T114 in that order and further includes a planar layer T115 below the color film layer T114 and a common electrode T116 below the planar layer T115;

The thin film transistor array substrate T13 is composed of pixel electrodes, a thin film transistor array layer T131 and a glass substrate T132;

The touch control layer includes a first metal layer T1122, an insulation layer T1123 and a second metal layer T113;

Specifically, reference is made to FIG. 7(a) illustrating a structural top view of the touch control layer, FIG. 7(b) illustrating a structure of the first metal layer of the touch control layer, and FIG. 7(c) illustrating a structure of the second metal of the touch control layer.

As illustrated in FIG. 7(a), the touch control layer includes a plurality of drive electrodes 301 and sense electrodes 303 arranged in a rectangle, and the plurality of drive electrodes 301 are connected together through first metal connection lines 302 to form a plurality of rows of drive electrodes, and the a plurality of drive sense electrodes 303 are connected together through second metal connection lines 304 to form a plurality of columns of drive electrodes More specifically, the first metal layer T1122 illustrated in FIG. 7(b) includes the plurality of drive electrodes 301, metal connection lines 302 and sense electrodes 303, where the plurality of drive electrodes 301 are connected through the plurality of first metal connection lines 302 in the X direction to form a plurality of rows of drive electrodes; and the sense electrodes 303 are insulated from each other. The second metal layer T113 illustrated in FIG. 7(c) is formed of a plurality of second metal connection lines 304 in the Y direction; and the insulation layer T1123 is arranged between the first metal layer T1122 and the second metal layer T113.

Where for the touch control layer formed of the first metal layer T1122, the insulation layer T1123 and the second metal layer T113, referring to a schematic diagram of the electrode connection structure illustrated in FIG. 8, a particular structure is as follows:

The drive electrodes 301 are connected in the X direction through a first metal connection line 302 to form a row of drive electrodes in the X direction, and the second metal layer T113 formed of the second metal connection lines 304 is located below the insulation layer T1123 below the first metal layer T1122; and also the surface of the insulation layer T1123 is punched, and thus two adjacent sense electrodes 303 are connected in the Y direction through a second metal connection line 304, and the sense electrodes 303 are thus connected through each respective second metal connection line, so that the sense electrodes at the first metal layer T1122 form a plurality of columns of sense electrodes in the Y direction.

Figure 9:
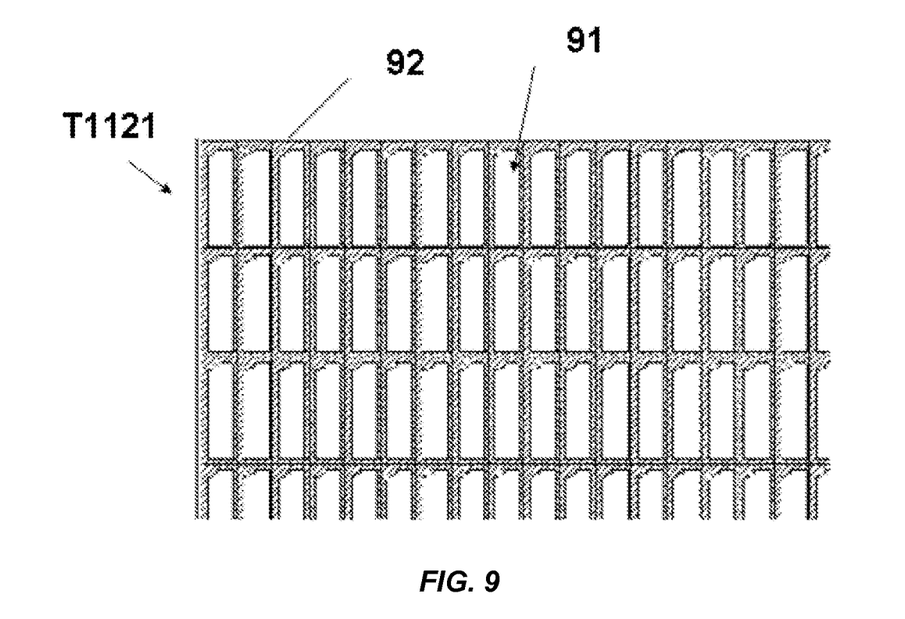
FIG. 9 is a schematic diagram of a partial structure of a black matrix layer in the light transmission direction.

Next referring to FIG. 9 which is a schematic diagram of a partial structure of the black matrix layer T1121 in the light transmission direction, as illustrated, the black matrix layer T1121 is a grid-shaped structure including light-transmitting sections 91 and light-blocking sections 92, both of which are arranged alternately. The light-transmitting sections 91 correspond to display regions of pixel elements and can have rays through the display regions of the pixel elements transmitted; and the light-blocking sections 92 correspond to data lines and scan lines on the thin film transistor array substrate T13 and shield the data lines and the scan lines in the light transmission direction.

Figure 8:
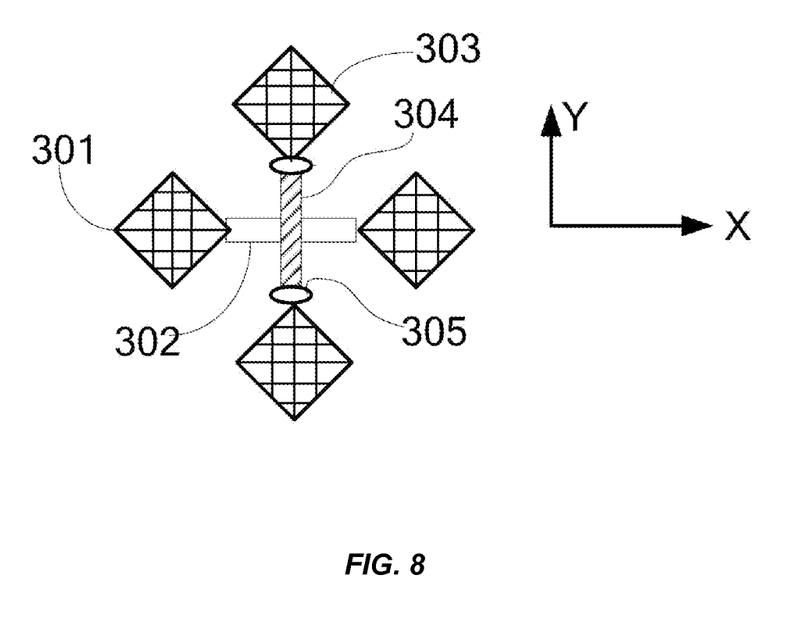
FIG. 8 is a schematic diagram of an electrode connection structure.
Figure 10:
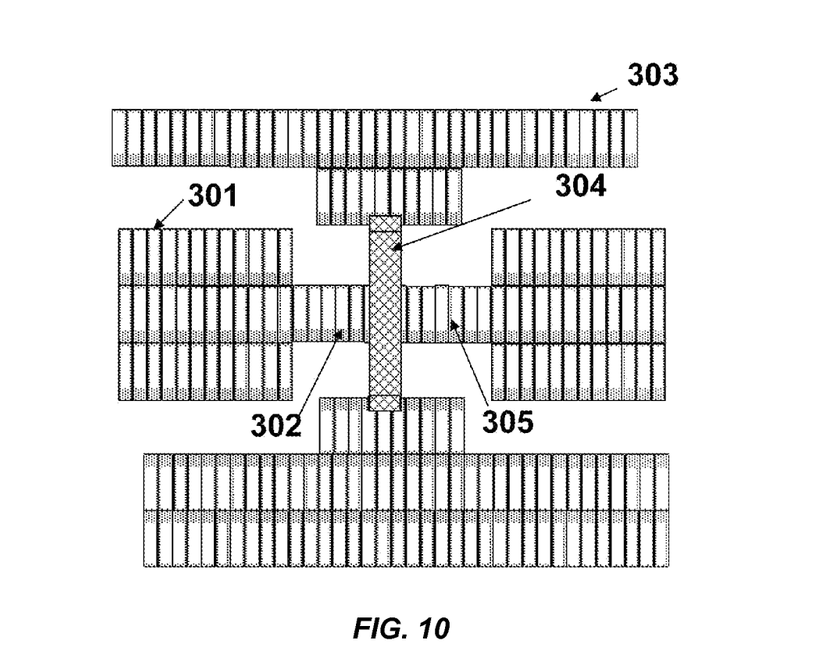
FIG. 10 is a schematic enlarged view of the electrode connection structure illustrated in FIG. 8.

In the present embodiment, the drive electrodes 301 and the sense electrodes 303 have a diamond-shaped pattern as illustrated in FIG. 8. Moreover both the drive electrodes 301 and the sense electrodes 303 are metal grid electrodes consisted of metal grids intersecting transversely and vertically, and the projection of the metal grid electrodes falls into the projection of the black matrix layer T1121 in the light transmission direction. Specifically, referring to FIG. 10 which is a schematic enlarged diagram of the drive electrodes 301 and the sense electrodes 303 and their connection sections, as illustrated in FIG. 10, the shape of the outline of the sense electrodes 303 and the drive electrodes 301 is a square, and the sense electrodes 303 and the drive electrodes 301 are metal grid electrodes consisted of metal grids intersecting transversely and vertically, and the projection of both the sense electrodes 303 and the drive electrodes 301 falls into the projection of the black matrix layer T1121 in the light transmission direction. It shall be noted that the shape of the outline of the sense electrodes 303 and the drive electrodes 301 is a square, and the internal shape of the electrodes agrees with the shape of the black matrix layer T1121.

In the present embodiment, the first metal connection lines 302 are also consisted of metal grids intersecting transversely and vertically; and in another embodiment, the first metal connection lines 302 can alternatively be a plurality of transversely arranged metal lines which completely fall into the projection of the black matrix layer T1121. Here it can be appreciated that the first metal connection lines 302 each play a role of electrically connecting two adjacent left and right sense electrodes, and then the first metal connection lines 302 can alternatively be only a plurality of transverse metal lines.

Thus all the sense electrodes 303, the drive electrodes 301 and the first metal connection lines 302 fall into the projection of the black matrix layer T1121 in the light transmission direction.

More preferably the second metal connection lines 304 are also consisted of metal grids intersecting transversely and vertically and also fall into the projection of the black matrix layer T1121 in the light transmission direction. In another embodiment, the second metal connection lines 304 can alternatively be a plurality of vertically arranged metal lines which completely fall into the projection of the black matrix layer T1121. Here it can be appreciated that the second metal connection lines 304 each play a role of electrically connecting two adjacent upper and lower sense electrodes, and then the second metal connection lines 304 can alternatively be only a plurality of vertical metal lines.

Preferably in the embodiment of the invention, the side length of the metal grid electrodes ranges from 50 to 150 μm.

Preferably in the embodiment of the invention, the line width of the metal lines of the metal grid electrodes is smaller than or equal to the width of a grid of the black matrix layer, that is, smaller than or equal to the line width of the light-blocking sections of the black matrix layer. Furthermore in the embodiment of the invention, the line width of the first metal connection lines and the second metal connection lines is smaller than or equal to the width of the grid of the black matrix layer, that is, smaller than or equal to the line width of the light-blocking sections of the black matrix layer.

Preferably in the embodiment of the invention, the line width of the metal lines of the metal grid electrodes ranges from 2-7 μm. Furthermore in the embodiment of the invention, the line width of the metal lines of the first metal connection lines and the second metal connection lines ranges from 2-7 μm.

Preferably in the embodiment of the invention, the material of the black matrix layer is a resin material with a resistance above 107Ω.

In the TN-type touch control liquid crystal display device according to the present first embodiment, the shape of all the metal grid electrodes, the first metal connection lines and the second metal connection lines is the same as the shape of the black matrix layer and determined by the shape and the size of the pixel elements of a liquid crystal screen. Since the shape of the metal grid electrodes is hollow, the area of the touch control layer facing the pixel electrodes and further a parasitic capacitance formed between the touch control layer and the pixel electrodes can be lowered greatly. Referring to the structure of the equivalent circuit illustrated in FIG. 3, with the technical solution of the present embodiment, the parasitic capacitance 105 is lowered to thereby facilitate detection of a signal of the touch screen and alleviate interference of the array substrate to the touch screen; and also the resistance 102 of the drive electrode and the resistance 104 of the sense electrode are lowered to thereby lower a load and ensure normal operation of the touch screen; and moreover the lowered parasitic capacitance will have a more pronounced effect for a touch control liquid crystal display device with a large-size.

Also in the present first embodiment, the metal grid electrodes including the drive electrodes 301 and the sense electrodes 303, the first metal connection lines and the second metal connection lines fall into the projection of the black matrix layer T1121 in the light transmission direction, and the line width of the black matrix layer is larger than or equal to the line width of the metal lines of the metal grid electrodes, the first metal connection lines and the second metal connection lines, that is, the projection of the metal grid electrodes, the first metal connection lines and the second metal connection lines completely falls into the projection of the black matrix layer in the light transmission direction, so the metal grid electrodes, the first metal connection lines and the second metal connection lines are invisible in the display regions of the pixel elements, and thus both the uniformity and the transmittivity of a display by the touch control liquid crystal display device are improved.

Furthermore since the drive electrodes, the sense electrodes, the first metal connection lines and the second metal connection lines can be shielded by the black matrix layer, all the drive electrodes, the sense electrodes, the first metal connection lines and the second metal connection lines can be made of a metal material to thereby greatly lower the resistivity of the touch control layer, lower power consumption of the device and improve the sensitivity of a touch control.

Preferably in the present embodiment, since the metal grids are not distributed uniformly through the touch control layer because there are gaps arranged between the adjacent metal grid electrodes to insulate the adjacent electrodes from each other, then the planar layer is provided in the present first embodiment in view of an influence of this non-uniform distribution upon the thickness in that the planar layer with a specific thickness eliminates completely this adverse influence.

Preferably the touch control layer is a non-uniformized grid layer, but since in the technical solution according to the present first embodiment, the common electrode layer T116 which is an integral electrode layer is arranged below the planar layer, the problem of a non-uniform electric field arising from the non-uniform metal grids can be shielded without any influence upon a display.

It shall be noted that the shape of the outline of the metal grid electrodes including the drive electrodes and the sense electrodes is illustrated as a square by way of an example but will not be limited thereto and can alternatively be, for example, a diamond or a triangle. The same applies to other embodiments, so a repeated description thereof will be omitted here.

Second Embodiment

Figure 11A:
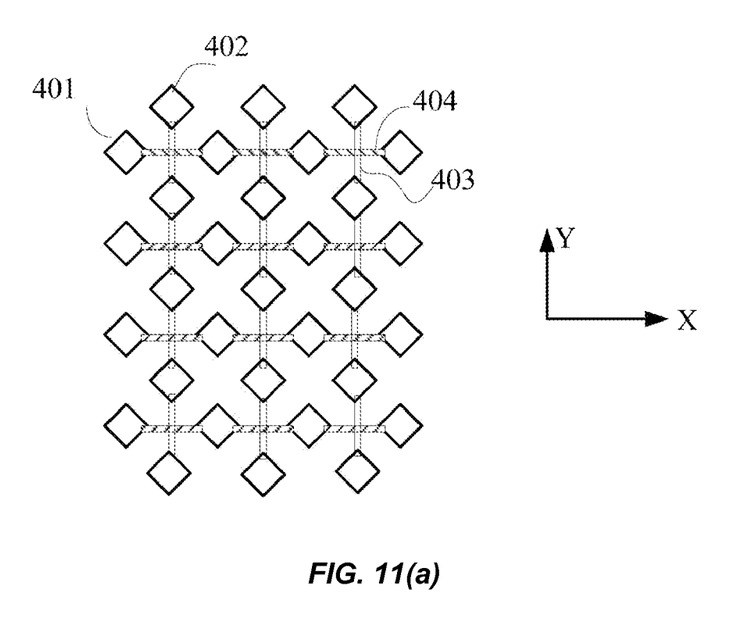
FIG. 11(a) is a structural top view of a touch control layer according to a second embodiment.
Figure 11B:
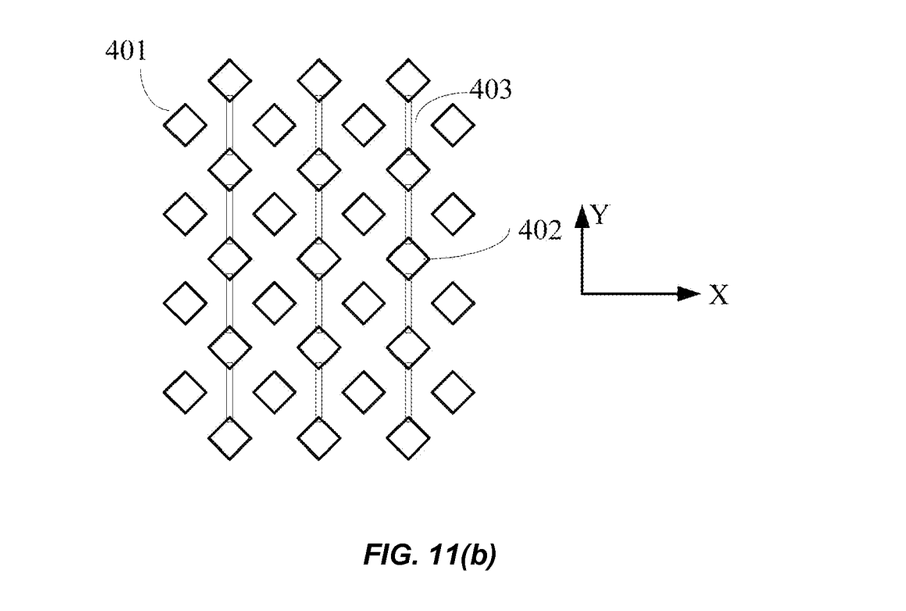
FIG. 11(b) is a schematic structural diagram of a first metal layer of the touch control layer according to the second embodiment.
Figure 11C:
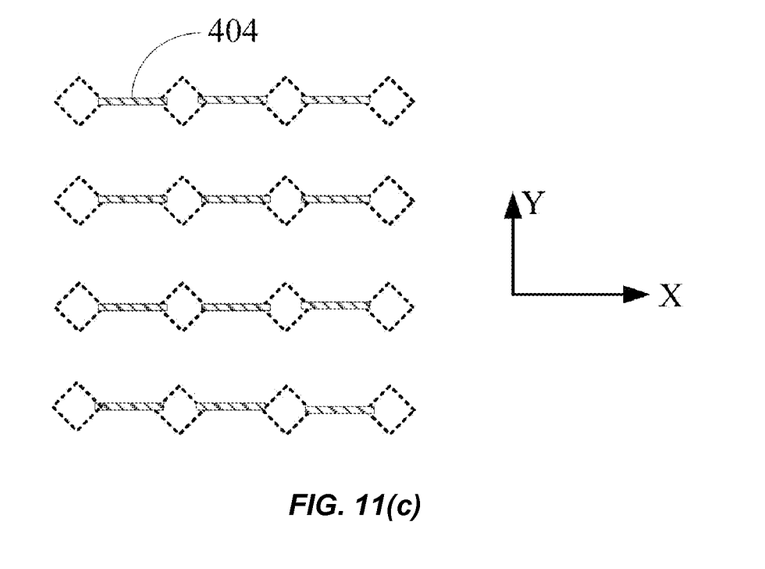
FIG. 11(c) is a schematic structural diagram of a second metal layer of the touch control layer according to the second embodiment.

In the present second embodiment, unlike the structure of the touch control layer according to the foregoing first embodiment, specifically a first metal layer includes drive electrodes, sense electrodes and second metal connection lines; and a second metal layer includes first metal connection lines. This variant of the structure will neither influence an implementation of the technical solution of the invention nor influence the advantageous effects thereof. Specifically the structure thereof is as illustrated in FIG. 11(*a*) and FIG. 11(*c*);

FIG. 11(*a*) is a structural top view of the touch control layer according to the second embodiment, and as illustrated in FIG. 11(*a*), the touch control layer includes a plurality of drive electrodes 401 and sense electrodes 403 arranged in a rectangle, and the plurality of drive electrodes 401 are connected together through first metal connection lines 404 in the X direction to form a plurality of rows of drive electrodes, and the plurality of sense electrodes 402 are connected together through second metal connection lines 403 in the Y direction to form a plurality of columns of sense electrodes;

More specifically, FIG. 11(*b*) illustrates the first metal layer including the plurality of drive electrodes 401, sense electrodes 402 and second metal connection lines 403, where the plurality of sense electrodes 402 are connected together through the plurality of second metal connection lines 403 in the Y direction to form a plurality of columns of sense electrodes; and FIG. 11(*c*) illustrates the second metal layer formed with the plurality of first metal connection lines 404 in the X direction.

The present second embodiment is structurally identical to the first embodiment except for the foregoing structure, so a detailed description thereof will be omitted here, and particular reference can be made to the first embodiment.

Third Embodiment

Figure 12A:
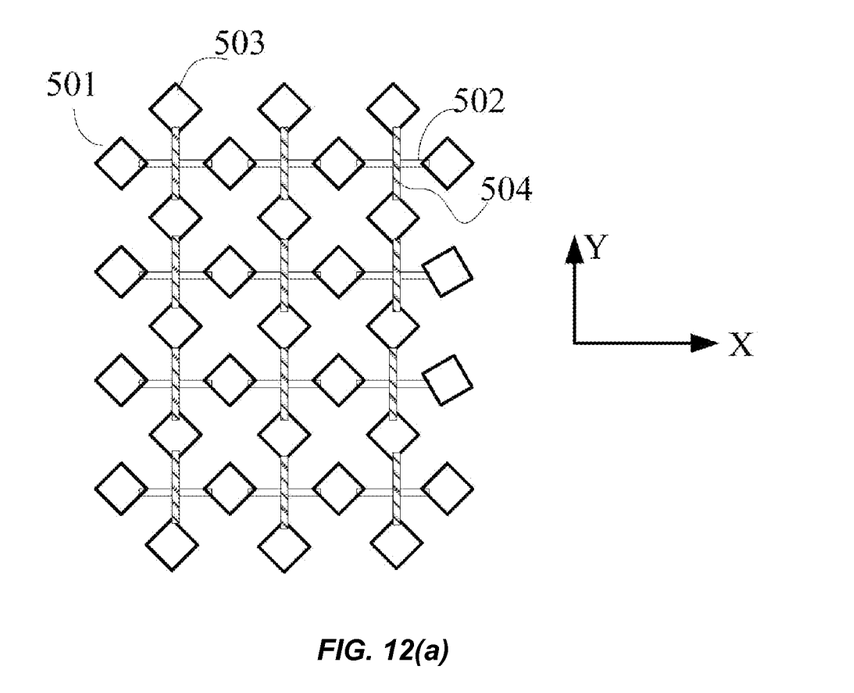
FIG. 12(a) is a structural top view of a touch control layer according to the second embodiment.
Figure 12B:
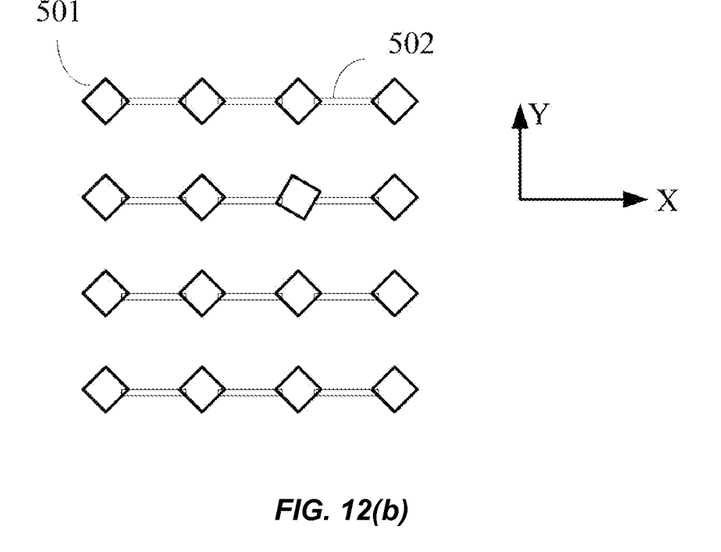
FIG. 12(b) is a schematic structural diagram of the first metal layer of the touch control layer according to the second embodiment.
Figure 12C:
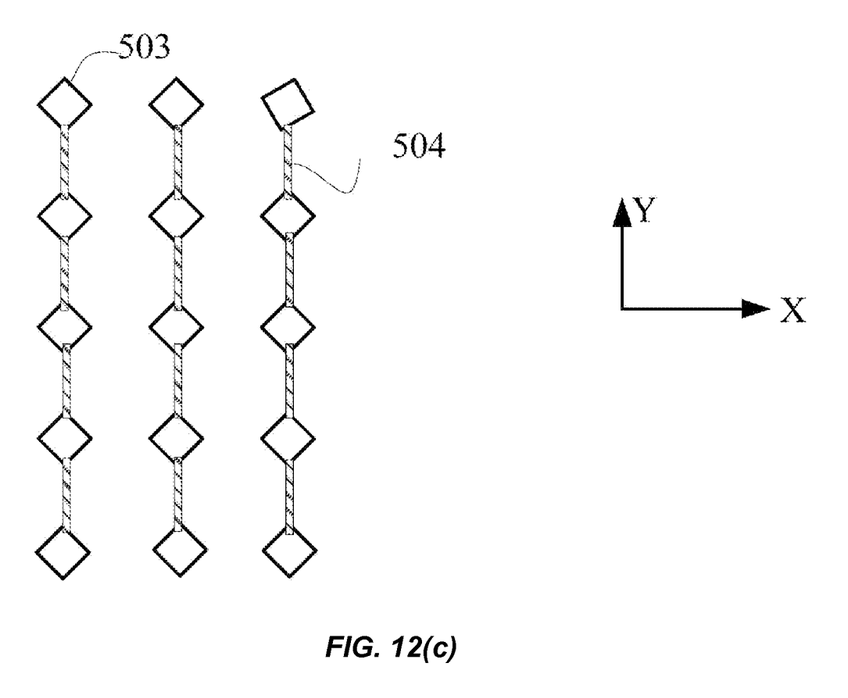
FIG. 12(c) is a schematic structural diagram of the second metal layer of the touch control layer according to the second embodiment.

In the present third embodiment, a description will be given also taking a TN-type touch control liquid crystal display device as an example, where unlike the first embodiment and the second embodiment, the structure of the touch control layer in the third embodiment includes a first insulation layer, an insulation layer and a second metal layer; and the first metal layer includes drive electrodes and first metal connection lines, and the second metal includes sense electrodes and second metal connection lines. This variant of the structure will neither influence an implementation of the technical solution of the invention nor influence the advantageous effects thereof. Specifically the structure thereof is as illustrated in FIG. 12(*a*) and FIG. 12(*c*);

As illustrated in FIG. 12(*a*), the touch control layer includes a plurality of drive electrodes 501 and sense electrodes 503 arranged in a rectangle, and the plurality of drive electrodes 501 are connected together through first metal connection lines 502 in the X direction to form a plurality of rows of drive electrodes, and the plurality of sense electrodes 503 are connected together through second metal connection lines 502 in the Y direction to form a plurality of columns of sense electrodes;

More specifically, FIG. 12(*b*) illustrates the first metal layer including the plurality of drive electrodes 501 and first metal connection lines 502, where the plurality of drive electrodes 501 are connected in the X direction through the plurality of first metal connection lines 502 to form a plurality of rows of drive electrode; and FIG. 12(*c*) illustrates the second metal layer including the plurality of sense electrodes 503 and second metal connection lines 504, where the plurality of sense electrodes 503 are connected together in the Y direction through the plurality of second metal connection lines 504 to form a plurality of columns of sense electrodes.

The present third embodiment is structurally identical to the first embodiment and the second embodiment except for the foregoing structure, so a detailed description thereof will be omitted here, and particular reference can be made to the first embodiment and the second embodiment.

Fourth Embodiment

Figure 13:
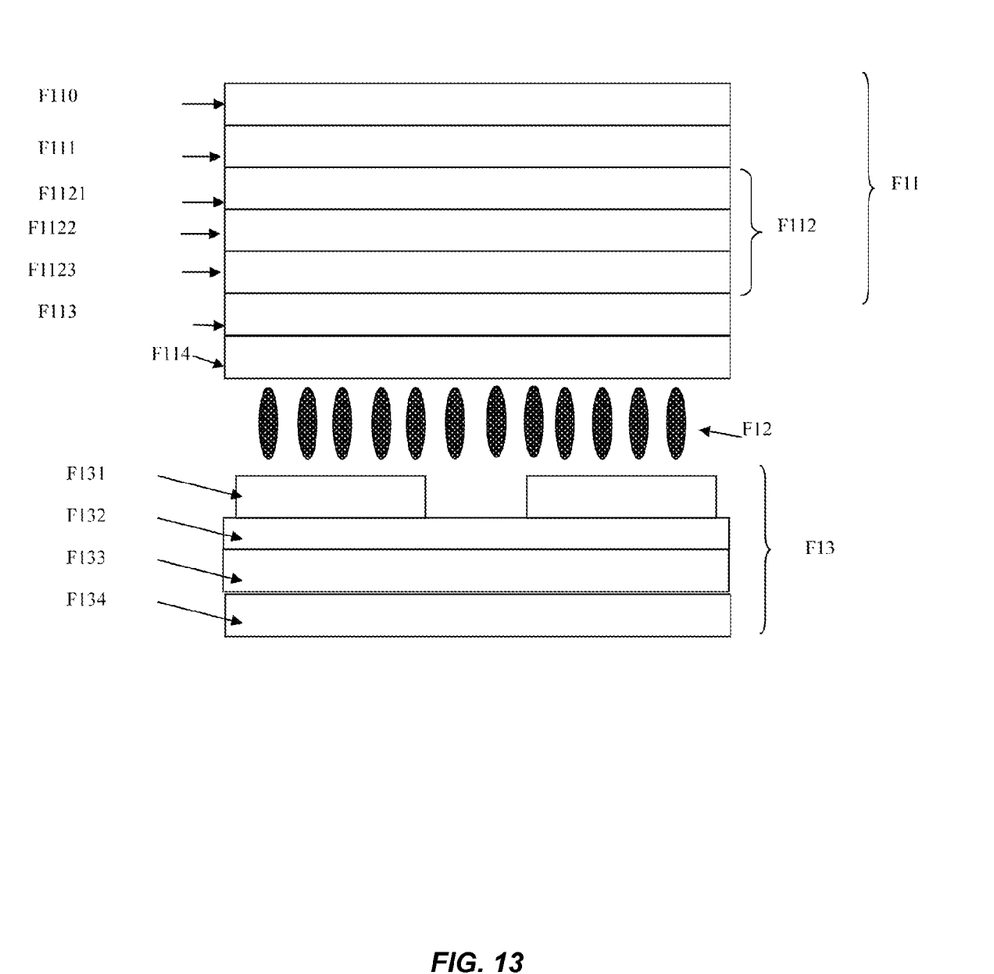
FIG. 13 is a schematic structural diagram of an FFS or IPS-type touch control liquid crystal display device according to a third embodiment.

The fourth embodiment of the invention provides an FFS or IPS-type touch control liquid crystal display device, referring to FIG. 13, a particular structure of which includes:

A color film substrate F11, a thin film transistor array substrate F13, and a liquid crystal layer F12 arranged between the color film substrate F11 and the thin film transistor array substrate F13;

Where the color film substrate F11 includes a glass substrate F110, a grid-shaped black matrix layer F111, a touch control layer F112 and a color film layer F113 in that order and further includes a planar layer F114 below the color film layer F113;

The thin film transistor array substrate F13 includes pixel electrodes F131, an insulation layer F132, a common electrode F133 and a glass substrate F134 in that order;

The touch control layer F112 includes a first metal layer F1121, an insulation layer F1122 and a second metal layer F1123; and the touch control layer includes a plurality of drive electrodes and sense electrodes arranged in a rectangle, and the plurality of drive electrodes are connected through a plurality of first metal connection lines to form a plurality of rows of drive electrodes, and the plurality of sense electrodes are connected through a plurality of second metal connection lines to form a plurality of columns of sense electrodes. Both the drive electrodes and the sense electrodes are metal grid electrodes consisted of metal lines intersecting transversely and vertically, and the projection of the metal grid electrodes completely falls into the projection of the black matrix layer F111 in the light transmission direction; and preferably the first metal connection lines and the second metal connection lines are also consisted of a plurality of metal lines intersecting transversely and vertically, and the first metal connection lines and the second metal connection lines also completely fall into the projection of the black matrix layer F111 in the light transmission direction, that is, in the present embodiment, the black matrix layer F111 completely shields the touch control layer in the light transmission direction.

Where each of the first metal layer F1121, the insulation layer F1122 and the second metal layer F1123 can particularly be identical to any structure illustrated in the first embodiment, the second embodiment or the third embodiment and also possess the same technical advantages, so a detailed description thereof will be omitted here, and particular reference can be made to the first embodiment, the second embodiment or the third embodiment.

In the FFS or IPS-type touch control liquid crystal display device according to the present fourth embodiment, the shape of the metal grids is shielded by the shape of the black matrix layer F111, and both the shape and the size thereof are determined by pixel elements of a liquid crystal screen. Since the shape of the grids is hollow, the facing area and further the capacitance can be lowered greatly. Like the TN-type touch control liquid crystal display device according to the first embodiment, the touch control liquid crystal display device according to the present fourth embodiment of the invention possesses the effects of lowering the parasitic capacitance formed between the touch control layer and the pixel electrodes, of improving the sensitivity of a touch control, of lowering the resistance of the touch control layer and of improving the uniformity of a display, and particular reference can be made to the first embodiment, so a detailed description thereof will be omitted here.

The touch control liquid crystal display device according to the present embodiment lowers noise of the touch control layer as compared with the FFS or IPS-type touch control liquid crystal display device in the prior art. Specifically, referring to FIG. 14 and FIG. 15, FIG. 14 is a schematic diagram of pixel elements corresponding to a touch control layer in the prior art, and FIG. 5 is a schematic diagram of pixel elements corresponding to a touch control layer in the FFS or IPS-type touch control liquid crystal display device according to the present embodiment.

Figure 14:
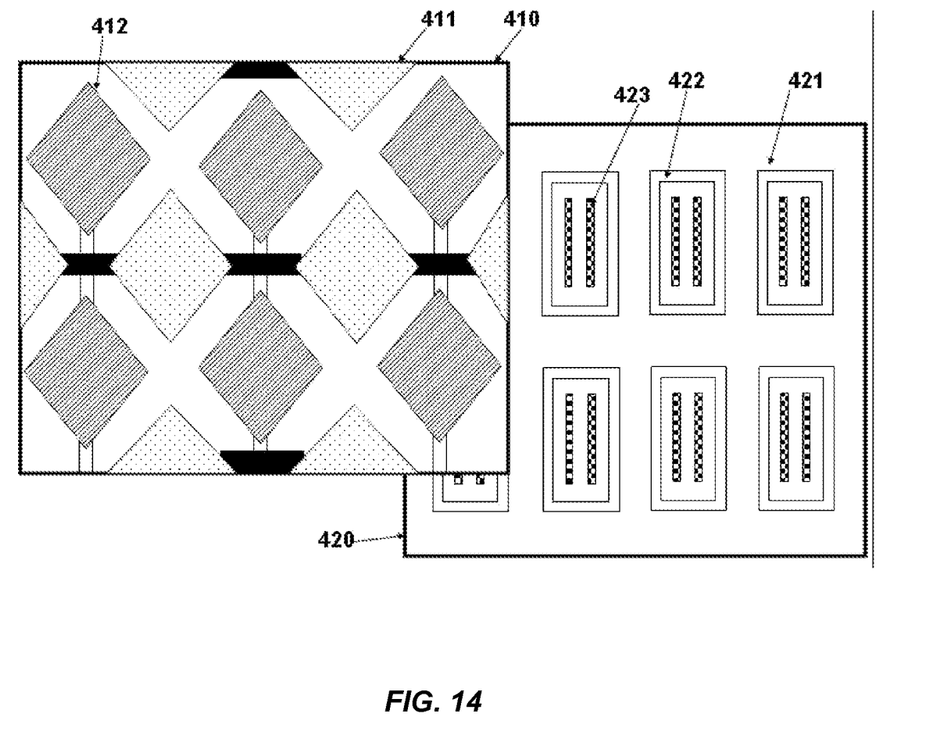
FIG. 14 is a schematic diagram corresponding to pixel elements and a touch control layer in the prior art.

As illustrated in FIG. 14, the touch control liquid crystal display device in the prior art includes a touch control layer 410 and an array substrate 420. On the touch control layer 410, there are included a plurality of diamond-shaped drive electrodes 411 and sense electrodes 412 arranged in a rectangle, and the drive electrodes 411 and the sense electrodes 412 are transparent ITO electrodes in material, and there are gaps arranged between adjacent drive electrodes 411 and the sense electrodes 412, and the plurality of drive electrodes 411 are connected through first connection lines into a plurality of rows of drive electrodes, and the plurality of sense electrodes 412 are connected through second connection lines into a plurality of columns of sense electrodes; and when there is a touch occurring, a mutual capacitance between a drive electrode 411 and a sense electrode 412 varies, and the touch is sensed. On the array substrate 420, there are arranged a plurality of pixel elements 421 arranged in a rectangular, and each of the pixel elements 421 includes a common electrode 422 and a strip-shaped pixel electrode 423, and when a voltage is applied between the common electrode 422 and the pixel electrode 423, a parallel electric field is formed between the common electrode 422 and the pixel electrode 423 to drive liquid crystal molecules in the pixel element to rotate. As illustrated, neither the shape nor the size of the pixel elements 421 on the array substrate 420 agrees with the shape or size of the drive electrodes 411 and the sense electrodes 412 on the touch control layer 410, but some pixel elements correspond to drive electrodes 411 or sense electrodes 412, and some pixel elements correspond to the gaps between the drive electrodes 411 or the sense electrodes 412, and then when the touch control layer 410 is in operation, the electric field emitting from the electrodes will not be uniform throughout the touch control layer 410, and the non-uniform electric field of the touch control layer 410 will influence a plane electric field of the respective pixel elements, thus resulting in different deflection of a part of the liquid crystal molecules from expected and further degrading a display effect.

Figure 15:
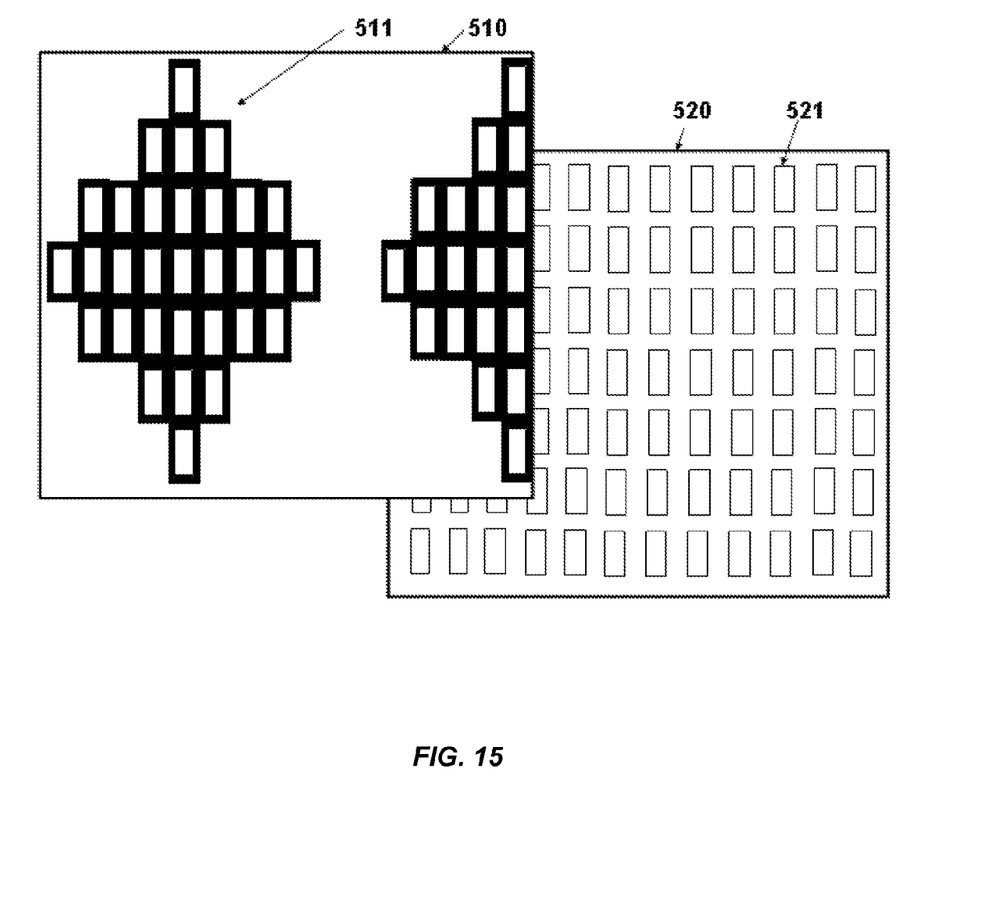
FIG. 15 a schematic diagram corresponding to pixel elements and a touch control layer in the FFS or IPS-type touch control liquid crystal display device according to the present embodiment.

Referring to FIG. 15, the touch control liquid crystal display device according to the invention includes a touch control layer 510 and an array substrate 520. On the touch control layer 510, there are included a plurality of diamond-shaped drive electrodes 511 and sense electrodes 512 arranged in a rectangle (not illustrated), and the plurality of drive electrodes 511 are connected through first connection lines into a plurality of rows of drive electrodes, and the plurality of sense electrodes 512 are connected through second connection lines into a plurality of columns of sense electrodes. Moreover both the drive electrodes 511 and sense electrodes 512 are metal grid electrodes consisted of metal lines intersecting transversely and vertically, and the projection of the metal grid electrodes completely falls into the projection of a black matrix layer in the light transmission direction. There are a plurality of pixel elements 521 arranged on the array substrate 520.

Light-transmitting sections of the metal grid electrodes correspond to display regions of the pixel elements 521, that is, the transverse and vertical metal lines in the metal grid electrodes correspond to non-display regions around the pixel elements. In the FFS or IPS-type touch control liquid crystal display device according to the fourth embodiment of the invention, although there are also gaps arranged between the drive electrodes and the sense electrodes, both the drive electrodes and the sense electrodes are metal grid electrodes, and the transverse and vertical metal lines correspond to the non-display regions around the pixel elements, so an electric field in the display regions of the respective pixel elements will be subject to a greatly lowered influence by an electric field of the touch control layer; and even if there is insignificant interference by a non-uniform electric field, the interference will influence arrangement of only liquid crystal molecules in the non-display regions of the pixel elements; and a black matrix layer is arranged above the liquid crystal molecules of these regions, and no rays can be transmitted because no display effect will be influenced. Thus the FFS or IPS-type touch control liquid crystal display device according to the fourth embodiment of the invention address the influence of noise of the touch control layer upon a parallel electric field of the FFS or IPS-type liquid crystal display in the prior art, improve the stability of operation of the FFS or IPS-type touch control liquid crystal display device and possesses significant technical effects.

In summary, the touch control liquid crystal display device according to the embodiment of the invention, the metal grids instead of ITO in the prior art are used as the electrodes of the touch screen to thereby lower a parasitic capacitance, facilitate detection of a signal and also alleviate interference of the thin film transistors to the electrodes of the touch screen and protect a structure of the electrodes of the touch screen; and moreover it is more likely to lower the parasitic capacitance in the case of a large size. Furthermore the electrodes formed of metal can bring a lowered resistance and consequently a lowered load than ITO electrodes. Also the invention dispenses with an ITO layer and consequently improves a transmittivity of light and also addresses the problem of a visual pattern of the ITO electrodes in the prior art.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A touch control liquid crystal display device, comprising:
    a color film substrate;
    a thin film transistor array substrate; and
    a liquid crystal layer arranged between the color film substrate and the thin film transistor array substrate,
    wherein the color film substrate comprises:
        a grid-shaped black matrix layer,
        a touch control layer, and
        a color film layer;
    wherein the touch control layer comprises:
        a plurality of metal grid electrodes arranged in a rectangle, wherein the metal grid electrodes comprise a plurality of metal lines intersecting transversely and vertically, and the metal grid electrodes comprise a plurality of drive electrodes and a plurality of sense electrodes, and wherein the plurality of drive electrodes are connected together through a plurality of first metal connection lines in a first direction, and the plurality of sense electrodes are connected together through a plurality of second metal connection lines in a second direction, and
    wherein the projection of the metal grid electrodes falls into the projection of the black matrix layer in the light transmission direction.

2. The touch control liquid crystal display device according to claim 1, wherein the touch control layer comprises a multi-layer structure comprising a first metal layer, a second metal layer, and an insulation layer arranged between the first metal layer and the second metal layer.

3. The touch control liquid crystal display device according to claim 2, wherein the plurality of drive electrodes, the plurality of sense electrodes, and the plurality of first metal connection lines are formed in the first metal layer, and wherein the plurality of second metal connection lines are formed in the second metal layer.

4. The touch control liquid crystal display device according to claim 2, wherein the plurality of drive electrodes, the plurality of sense electrodes, and the plurality of second metal connection lines are formed in the first metal layer, and wherein the plurality of first metal connection lines are formed in the second metal layer.

5. The touch control liquid crystal display device according to claim 2, wherein the plurality of drive electrodes and the plurality of first metal connection lines are formed in the first metal layer, and wherein the plurality of sense electrodes and the plurality of second metal connection lines are formed in the second metal layer.

6. The touch control liquid crystal display device according to claim 2, wherein the plurality of sense electrodes and the plurality of second metal connection lines are formed in the first metal layer, and wherein the plurality of drive electrodes and the plurality of first metal connection lines are formed in the second metal layer.

7. The touch control liquid crystal display device according to claim 1, wherein the shape of the outline of the metal grid electrodes is a square, a triangle, a diamond or another regular shape.

8. The touch control liquid crystal display device according to claim 1, wherein the side length of the metal grid electrodes is between about 50 μm and 150 μm.

9. The touch control liquid crystal display device according to claim 1, wherein the line width of the metal grid electrodes is less than the line width of a grid of the black matrix layer.

10. The touch control liquid crystal display device according to claim 1, wherein the line width of the metal lines in the metal grid electrodes is between about 2 μm and 7 μm.

11. The touch control liquid crystal display device according to claim 1, wherein the material of the black matrix layer is a resin material with a resistance above 107Ω.

12. The touch control liquid crystal display device according to claim 1, further comprising a planar layer below the color film layer.

13. The touch control liquid crystal display device according to claim 12, wherein the thickness of the planar layer is between about 1 μm and 5 μm.

14. The touch control liquid crystal display device according to claim 1, wherein the protection of the first metal connection lines or the second metal connection lines falls into the protection of the black matrix layer in the light transmission direction.

15. The touch control liquid crystal display device according to claim 14, wherein the first metal connection lines or the second metal connection lines comprises a plurality of metal lines intersecting transversely and vertically, or
    the first metal connection lines or the second metal connection lines comprise a plurality of transverse metal lines, or
    the first metal connection lines or the second metal connection lines comprise a plurality of vertical metal lines.

* * * * *